Patented July 31, 1945

2,380,726

UNITED STATES PATENT OFFICE 2,380,726

CHLORINATED SYNTHETIC RUBBER

Gaetano F. D'Alelio, Pittsfield, Mass., assignor to General Electric Company, a corporation of New York No Drawing. Application December 10, 1941,
Serial No. 422,401

4 Claims. (Cl. 260—84.5)

This invention relates to synthetic rubber of the type known as "Perbunan" and is concerned particularly with a chlorinated "Perbunan" possessing new and novel physical properties.

"Perbunan" and "Perbunan Extra" synthetic rubber-like materials, which are vulcanizable mixed polymers of 1,3-butadiene and acrylic acid nitrile, are described for example in Patent 1,973,000 Konrad et al. Ordinarily commercial "Perbunan" contains from 20 to 30 per cent by weight of acrylic acid nitrile while the "Perbunan Extra" has a higher acrylic acid nitrile content but generally not exceeding about 40 per cent by weight of the rubber-like materials. "Perbunan" is one of the most widely used substitutes for rubber. It resembles rubber in many of its physical and chemical properties and has been recognized and used as a substitute for rubber in many applications.

In the unvulcanized state, 1,3-butadiene-acrylic acid nitrile mixed polymerizates are non-elastic in that sheets or strips thereof do not return to their original form after being elongated or stretched to a substantial extent. Again, like unvulcanized crepe rubber, these mixed polymerizates are physically weak and tend to tear when stretched.

The present invention is based on my discovery that tough, strong, elastic products which have an extensibility of the order of 600% over the non-chlorinated starting material may be obtained by introducing up to 3 per cent, preferably from 1 to 2 per cent, by weight, of chlorine into the 1,3-butadiene-acrylic acid nitrile mixed polymers, particularly the "Perbunan" synthetic rubbers.

Any of a number of ways may be used for chemically combining chlorine with the mixed polymerizate. For example, the polymerizate is swollen by the addition of any liquid swelling agent such as carbon tetrachloride, benzene, toluene, ethylene dichloride, or the like which is absorbed by and swells the polymerizate and then is treated with chlorine gas in a pressure-tight system. Preferably the reaction is carried out under conditions such that the swelling agent does not react with the chlorine. By this method, a commercial grade of "Perbunan" is swollen in carbon tetrachloride and then is placed in an airtight container and treated with chlorine gas at a pressure of about 21 inches of mercury for six days. Three chlorinated products are obtained. A white brittle non-rubbery mass forms on the top of the swollen mass where there is little or no carbon tetrachloride. It is found to contain about 45 per cent by weight of chlorine. Another portion of the mass also becomes brittle and non-rubbery, but rather brownish in color, and contains about 22 per cent by weight of chlorine. The major portion of the chlorinated mass is a very tough, rubbery product which is much stronger and more elastic than the original "Perbunan." This rubbery product contains about 1.85 per cent by weight of chlorine.

As the above-mentioned brittle non-rubbery chlorinated products result from over chlorination of the "Perbunan" primarily in those portions of the swollen mass in most direct contact with the chlorine gas, it is desirable that the chlorination of the "Perbunan" should be controlled to result in the production of only the tough, rubbery product. This may be done either by subjecting the swollen mass to constant agitation during the chlorination reaction or by controlling the amount of chlorine available for the reaction. For example, the chlorination reaction may be carried out in a closed chamber wherein the mass is being continually mixed or agitated by means of suitable mixing devices during the time the chlorine gas is being introduced. Alternatively, the degree of chlorination of the mixed polymerizate may be controlled by introducing a predetermined amount of chlorine into the polymerizate in the form of a solution of chlorine in a solvent, such as carbon tetrachloride, chloroform or ethylene dichloride and by using very thin sheets of the synthetic rubber to be chlorinated. Preferably the mass is agitated vigorously during and after the addition of the chlorine solution.

After the mixed polymerizate has been chlorinated to the desired extent, the solvent is removed by drying the product to constant weight. The dried product softens sufficiently under heat and pressure so that it can be molded to form articles of exceedingly high strength.

The rubbery chlorinated product is sufficiently plastic to be worked on rubber rolls. It may be modified by the addition of fillers, i. e. carbon black, zinc oxide, the highly chlorinated mixed polymerizates mentioned hereinbefore, etc., and/or vulcanizers, vulcanization accelerators and activators, etc., such as those used in vulcanizing the unchlorinated mixed polymerizate. The modified or unmodified products may then be substituted for the ordinary mixed polymerizate in any of its numerous applications, such as oil-resistant cable sheathing, molding compounds, flexible, oil-resistant gaskets, tires, hose, or wherever a product having greater strength, toughness, and elasticity is required. Other modifiers include various resins, "Perbunan" or other natural or synthetic rubbers, which will lend their own properties to the modified products.

If desired, the plasticity and extrudability of the chlorinated product may be improved by the addition of suitable softeners such as tricresyl phosphate, dibenzyl ether, certain alkyd resins or the like.

Although I have described my invention with particular reference to "Perbunan" it is to be understood that it is also applicable to the "Perbunan Extra" containing a larger proportion of acrylic acid nitrile.

What I claim as new and desire to secure by Letters Patent of the United States is:

1. A chlorinated mixed polymerizate of 1,3-butadiene and acrylic nitrile containing from 1 to 3 per cent by weight of chlorine, the said polymerizate containing from 20 to 40 per cent by weight of acrylic nitrile.

2. A tough, strong, elastic, chlorinated mixed polymerizate of 1,3-butadiene and acrylic nitrile containing from 1 to 2 per cent chlorine chemically combined therewith, the said polymerizate comprising from 20 to 30 per cent by weight of acrylic nitrile.

3. The vulcanized product of claim 1.

4. A tough, strong, elastic chlorinated mixed polymerizate of 1,3-butadiene and acrylic acid nitrile containing about 1.85 per cent chlorine, the acrylic acid nitrile comprising from 20 to 30 per cent by weight of said mixed polymerizate.

GAETANO F. D'ALELIO.